Patented July 13, 1943

2,324,249

UNITED STATES PATENT OFFICE 2,324,249

HALO-SUBSTITUTION OF SATURATED ORGANIC COMPOUNDS

William E. Vaughan and Frederick F. Rust, Berkeley, Calif., assignors to Shell Development Company, San Francisco, Calif., a corporation of Delaware No Drawing. Application September 1, 1942, Serial No. 456,959

13 Claims. (Cl. 260—662)

The present invention relates to the halo-substitution of saturated organic compounds, and more particularly pertains to a catalytic process for effecting the halogenation, via substitution, of a saturated aliphatic and alicyclic hydrocarbons or of their partially halogenated derivatives. The present application is a continuation-in-part of our co-pending application, Serial No. 293,256, filed September 2, 1939, now Patent No. 2,299,441.

The halogenation of saturated organic compounds, such as saturated aliphatic and alicyclic hydrocarbons, as well as partially halogenated derivatives thereof, is well known. These hydrocarbons react with the halogens, such as chlorine, bromine and iodine, to form products of halo-substitution, i. e. compounds in which one or more halogen atoms take the place of hydrogen atoms of the compound subjected to halogenation. It is also known that such halo-substitution reaction between a halogen and a saturated organic compound of the class described may be effected by subjecting the mixture to elevated temperatures which favor the halo-substitution reaction, these temperatures, however, being below those at which substantial degradation and/or decomposition of the reactants and/or products of reaction occurs.

Generally, the halo-substitution reaction between saturated aliphatic and/or alicyclic organic compounds and the halogen is effected by mixing the reactants, and then subjecting the mixture thus formed to the desired reaction temperature. As an alternative, the saturated aliphatic or alicyclic compounds to be halogenated, or the partially halogenated derivatives thereof to be subjected to further halo-substitution, are heated and then mixed with a heated or unheated halogen, thereby effecting the desired reaction; or the heated halogen may be mixed with the unheated organic compound to be halogenated or with an organic compound which is heated to a lesser degree. Since the halo-substitution reaction is exothermic in character it is unnecessary to preheat a reactant or the reactants to the optimum temperature at which the reaction is to be effected. The desired or necessary temperature for effecting such substitution reactions will naturally vary with the nature of the saturated organic reactant, the character of the halogen employed, the type of reactor, the presence or absence of a diluent, the employed pressure, space velocity, etc. Generally, it may be stated that the optimum temperatures for the thermal halo-substitution of the above outlined and hereinbelow more fully described class of organic compounds will lie between about 225° C. and about 700° C., the upper limit being controlled and determined by the degree of degradation or decomposition of the reactants and/or reaction products obtained.

The use of such relatively high temperatures is frequently undesirable because of the relatively high initial costs of the plant installation and the cost of its maintenance and operation. Also, due to the above mentioned exothermic character of the halo-substitution reactions, it is frequently difficult to control these high temperature reactions, which usually tend to cause excess decomposition of the reactants, formation of carbon and tars, etc. Furthermore, the aforementioned high temperature reactions necessitate the preheating of the reactants. Since halogen is highly reactive especially at the relatively high temperatures ordinarily employed for the thermal halo-substitution of the saturated hydrocarbons of the class mentioned and described herein, it is often necessary to employ preheaters, mixers, and/or reactors which are constructed of or at least lined with special materials, such as hard carbon, Monel metal, Hastelloy, and the like, which are substantially inert to and unattacked by the halogen even at the elevated temperatures employed. Obviously, this further increases the initial and maintenance costs of installations employed for the thermal halogenation of saturated aliphatic and/or alicyclic organic compounds, as well as of their partially halogenated saturated derivatives capable of being further halogenated via substitution.

It is therefore the general object of the present invention to avoid the above and other defects and difficulties, and to provide an improved process for the halogenation, via substitution, of saturated organic compounds, and particularly of saturated aliphatic and/or alicyclic hydrocarbons and of their partially halogenated derivatives. It is a further object to provide an improved process wherein saturated organic compounds of the class described herein may be effectively and economically reacted with a free halogen, or with a reactant capable of yielding a free halogen under the operating conditions employed, at relatively lower temperatures which could not be employed heretofore for the production of products of halo-substitution. A still further object is to provide a process wherein the above-outlined saturated organic compounds may be effectively halogenated, via substitution, at temperatures below about 225° C., i. e. below the lower temperature limit at which said compounds could be previously thermally halogenated in the dark.

It has now been discovered that the above and other objects may be attained by effecting the halo-substitution reaction in the presence of certain catalysts having definite and specific characteristics. Generally speaking, these catalysts comprise azo-compounds which are capable of yielding free radicals under the halogenating conditions employed. In other words, the above and other objects may be attained in accordance with the process of the present invention by employing as the catalyst the azo-compounds which are at least partially dissociated and exist in such partially dissociated state under the operating conditions employed during the halogenation reaction.

The term "free radical," as employed herein and in the appended claims, refers to an organic compound in which not all of the valences are satisfied (see Hackh's Chemical Dictionary, second edition, page 397). These free radicals are electrically neutral molecules possessing an unpaired electron and exhibiting an unsaturated behavior. These properties distinguish the free radicals from ions (such as those obtained by the ionization of certain salts or in electric discharges in gases).

It has also been discovered that when azo-compounds are employed as the catalyst, these azo-compounds are at least partially dissociated to produce free radicals which exist as such during the halogenation reaction and which catalyze the reaction between the halogens and the saturated organic compounds of the outlined class, so that the halo-substitution reaction may be effectively and efficiently realized at relatively low temperatures. Thus, as will be brought out more fully hereinbelow, by using an azo-compound capable of yielding free radicals under the operating conditions, it is now possible to effect the reaction between a halogen and a saturated organic compound to produce high yields of products of halo-substitution even at temperatures at which no, or substantially no, halo-substitution could be realized if the reaction were to be attempted at such temperatures without the use of the catalyst. It was further discovered that the presence of the partially dissociated or cleaved azo-compounds (which thus exist as free radicals under the operating conditions) permits the effecting of the above halo-substitution reaction in the liquid and/or the vapor phases and at temperatures effectively below 200° C. or 225° C., which is usually the minimum temperature range for the non-catalytic, thermal halogenation, via substitution, of the outlined class of saturated aliphatic and alicyclic hydrocarbons, and of their partially halogenated derivatives.

Representative saturated organic compounds of the class which may be halo-substituted in accordance with the process of the invention are the saturated aliphatic hydrocarbons, such as ethane, propane, n-butane, isobutane, n-pentane, isopentane, and the straight and branched-chain hexanes, heptanes, octanes, nonanes, and the like; the alicyclic hydrocarbons, as cyclopropane, cyclobutane, cyclopentane, cyclohexane, the higher homologues thereof, and the alkylated cycloparaffins such as methyl cyclopentane, methyl cyclohexane, ethyl cyclohexane, and the like; and the partially halo-substituted normal and branched-chain saturated aliphatic and alicyclic hydrocarbons, such as ethyl chloride, dichloroethane, 1-chloro-propane, 2-chloro-propane, 1,1-dichloro-propane, 1,2-dichloro-propane, 1,3-dichloro-propane, dibromopropanes, monochlorobutanes, dichlorobutanes, mono bromobutanes, dibromobutanes; monochloro-cyclopentane, and the like, and their homologues and analogues. The saturated aliphatic or alicyclic compound may also be linked to one or more aromatic radicals. For example, compounds which may be treated in accordance with the process of the present invention include phenyl alkyl hydrocarbons and products of their partial halo-substitution. Also, saturated aliphatic and alicyclic acids, ketones, alcohols, esters, etc., fall within the class of compounds which may be employed as the primary material.

All azo-compounds which yield free radicals under the halogenating conditions employed are suitable as the halo-substitution promoting catalysts, these azo-compounds having the characteristics of favoring or catalyzing the halo-substitution reaction at temperatures substantially lower than those heretofore necessary and/or desirable for the thermal, non-catalytic halogenation, via substitution, of the described class of saturated aliphatic and alicyclic organic compounds. In other words, these azo-compounds are thermally dissociated under the influence of the operating conditions maintained in the halogenation reaction zone, and these partially dissociated azo-compounds (which are in the form of free radicals) effect or promote the halogenation of the saturated organic compounds at temperatures below about 200° C., and even at room temperatures or below and in the liquid phase. Such low temperatures are wholly ineffective or at least highly inefficient for the non-catalytic halo-substitution reactions in accordance with the previously known processes.

It was stated above that all azo-compounds which are dissociated into free radicals under the influence of the operating conditions maintained in the reaction zone will catalyze or promote the halo-substitution reaction catalyst with the process of the present invention. Generally, all non-aromatic azo-compounds such as azo-methane, azo-isopropane, methyl-isopropyl diamide, dimethyl triazine, and the like, and their homologues and analogues, may be employed as the azo-compounds which will catalyze the halo-substitution reaction. Also, azo-compounds in which one of the nitrogen atoms of the azo-group is directly attached to an aromatic nucleus while the other nitrogen is directly linked to an alkyl radical, may also be employed as the catalyst. Methyl azo-benzene and ethyl azo-benzene are representative examples of this group of azo-compounds suitable as catalysts for the desired halo-substitution reaction.

The optimum temperatures to be employed for the halo-substitution according to the present invention depend upon a number of variables such as the specific saturated aliphatic or alicyclic organic compounds to be halogenated, the halogen employed, as well as on the specific azo-compound used as the catalyst. The temperature must be such that the azo-compound is dissociated or cleaved to liberate the organic free radicals which catalyze the halo-substitution reaction. Since such temperatures will be different for the various azo-compounds which comprise the halogenation promoting agents or catalysts of the present invention, it is impossible to specify any definite optimum temperatures However, it may be stated that when an azo-compound is used as the catalyst, it is possible to effect the halogenation, via substitution, of the saturated aliphatic and/or alicyclic hydrocarbons and of their partially halogenated derivatives at temperatures substantially below those necessary for such halo-substitution when the reaction is attempted without the use of the catalyst. In fact, the present invention permits the effecting of the halo-substitution reaction not only in the vapor phase, but also in the liquid phase. In this connection, it must be noted that some of the azo-compounds may not be cleaved or dissociated to yield the free radicals until or unless subjected to relatively high temperatures. Such compounds therefore may not be useful as halogenation promoting catalysts since the high temperatures necessary for their cleavage will also initiate the halogenation reaction by activating the halogen employed and thus initiating the reaction chain mechanism. It is possible, however, that the halogen will react with such azo-compounds to effect the cleavage thereof and the liberation of the free radicals under the operating conditions, or that the effect of the activated halogen and of the free radicals formed by the dissociation of the azo-compound will be cumulative, thereby increasing the rate of halo-substitution obtained.

The invention is illustrated by the following examples which are presented herein for the purpose of showing the advantages derived from operating according to the process of the present invention and the results obtained thereby. It is understood, however, that these examples are merely illustrative of the invention and are not to be considered as limiting the invention in any sense.

*Example I*

Normal butane, chlorine and a diluent, such as nitrogen, were mixed at a temperature of about 160° C., the attempted reaction being effected in the dark and with rigid exclusion of oxygen. The diluted reaction mixture was conveyed through a tubular reactor (having a volume equal to 60 cc.) at a rate of 50 cc. per minute of chlorine, 100 cc. per minute of n-butane, and 150 cc. per minute of nitrogen. At the end of a 40 minute run, an analysis disclosed that about 96% of the chlorine was passing through the reaction zone unchanged, while only about 4% of the chlorine was converted to hydrogen chloride as a result of a substitution reaction with the hydrocarbon.

*Example II*

This run was effected in an apparatus identical with that employed in the above-described example. In this case, however, the diluted reaction mixture contained a small amount of azo-methane. These reactants were conveyed through the reaction zone at the rate of 50 cc. per minute of chlorine, 100 cc. per minute of n-butane, 148 cc. per minute of nitrogen, and 2 cc. per minute of azo-methane. As in the previous example, the reaction was effected at a temperature of about 160° C., and oxygen and light were rigidly excluded. At the end of the 40 minute run, it was found that approximately 93% of the chlorine reacted, and the large amounts of hydrogen chloride evolved proved a high degree of chlor-substitution into the butane treated. It is to be noted that the azo-methane was employed in an amount equal to about 0.67 mol per cent as calculated on the basis of the gaseous mixture subjected to halogenation.

The above examples bring out the advantages derived from effecting the halo-substitution reaction according to the present process. Thus, whereas substantially no reaction occurred at 160° C. when the interaction between butane and chlorine was attempted without the use of any catalyst, a substantially complete reaction was effected with the small quantity (0.67 mol per cent) of azo-methane. It is thus seen that the introduction of even very small quantities of azo-compounds (which are dissociated to yield free radicals under the halogenating conditions) permits the realization of the halo-substitution of saturated aliphatic or alicyclic organic compounds in the absence of actinic radiations and at temperatures at which no, or at least substantially no, halo-substitution occurs when a catalyst is not employed. As stated, very small quantities of the azo-compound are sufficient to effect substantially complete halo-substitution. For instance, it is possible to effect the reaction with quantities of the above-described catalyst ranging from very small percentages of the order of about 0.1 mol per cent to about 4 or 5 mol per cent. However, still higher or lower percentages may be found desirable or even advantageous under certain conditions of operation, depending for instance on whether the reaction is effected in the liquid phase and at relatively low temperatures, or in the vapor phase and at relatively higher temperatures.

Although the invention has been described with particular reference to the chlorination of saturated aliphatic hydrocarbons, and more particularly of n-butane, it is to be understood that saturated alicyclic hydrocarbons, other saturated organic compounds, as well as the partially halogenated derivatives of these organic compounds, may be halogenated, i. e., subjected to chlorination, bromination and/or iodination, via substitution, in accordance with the process of this invention. Also, instead of employing a free halogen per se, any of the known free halogen yielding substances, which are capable of liberating a free halogen under the conditions existing in the reaction system, may also be used. As such, reference is made to sulfuryl chloride, nitrosyl chloride, etc.

It will be further evident to those skilled in the art that the invention may be executed in a batch, intermittent or continuous manner. Generally, it is preferable to employ an amount of halogen not in excess of that theoretically required to react with all of the saturated aliphatic and/or alicyclic organic compound to be halogenated. The presence of an excess of the halogen is usually avoided since such excesses are conducive to the formation of undesirable highly halogenated products, while an excess of the compound to be halogenated is often desirable in the reaction zone.

The reaction may be effected at any suitable pressure. Generally, the halo-substitution reaction according to the present invention may be effected at atmospheric pressure although somewhat higher or lower pressures may be employed. Furthermore, the reaction may be effected in the vapor or liquid phases, or in a vapor-liquid phase, i. e. while one or both of the reactants and/or the reaction products are partially in a liquid and partially in a vapor state.

In the above examples the nitrogen was employed merely for the purpose of diluting the hydrocarbon-chlorine mixture. Such dilution facilitates the control of the reaction since it prevents or decreases excess decomposition, "flashing" of the mixture, and tar and carbon formation. Obviously, the use of such diluent may be dispensed with, or other inert diluents, such as carbon dioxide or helium, may be employed in connection with, or in lieu of, the above diluents.

As pointed out above, the presence of the free radicals formed by the decomposition or cleavage of the azo-compounds, allows the realization of the halo-substitution reaction at substantially lower temperatures than those which are necessary for effecting a substantial halo-substitution by thermal, non-catalytic halogenation. Also, the use of the small percentages of the catalyst described herein increases the rate of the halo-substitution, so that, under identical operating conditions, the halo-substitution in the presence of the azo-compounds will require a relatively shorter period of residence time as compared to that required for a thermal, non-catalytic halo-substitution reaction. Therefore, the present process allows greater space velocities to effect the same conversion of the saturated organic compounds into their halo-substituted derivatives, thus increasing the effective capacity of any given reaction chamber. It is thus seen that the process of the present invention finds utility even when the halo-substitution reaction is effected at temperatures which are sufficient to activate the halogen and thus cause halo-substitution even in the absence of the catalyst.

We claim as our invention:

1. A process of halogenating a saturated aliphatic hydrocarbon which comprises reacting said hydrocarbon with a halogen selected from the group consisting of chlorine, bromine and iodine, in the vapor phase, at a temperature of below 200° C., and in the presence of azo-methane employed in an amount up to 5 mol per cent as calculated on the basis of the gaseous mixture subjected to the halogenation reaction.

2. The process according to claim 1, wherein chlorine is employed as the halogenating agent.

3. A process of halogenating a saturated aliphatic hydrocarbon which comprises reacting said hydrocarbon with a halogen selected from the group consisting of chlorine, bromine and iodine, in the vapor phase, at a temperature of below 200° C., and in the presence of small quantities of an aliphatic azo-compound which yields halogenation promoting free radicals under the operating conditions.

4. A process of halogenating a saturated aliphatic hydrocarbon which comprises reacting said hydrocarbon with a halogen selected from the group consisting of chlorine, bromine and iodine, at a temperature of below 200° C., and in the presence of small quantities of an aliphatic azo-compound which yields halogenation promoting free radicals under the operating conditions.

5. The process according to claim 4, wherein the reaction is effected in the presence of azo-methane.

6. A process for the halogenation of a saturated aliphatic hydrocarbon which comprises mixing the hydrocarbon to be treated with a halogen selected from the group consisting of chlorine, bromine and iodine, and effecting the reaction in the absence of actinic radiation and in the presence of a halogenation promoting catalyst comprising a partially dissociated aliphatic azo-compound.

7. A process for the halogenation of a saturated alicyclic hydrocarbon which comprises reacting said hydrocarbon with a halogen selected from the group consisting of chlorine, bromine and iodine, in the presence of an aliphatic azo-compound which yields free radicals under the operating conditions.

8. A process of halogenating a saturated hydrocarbon which comprises reacting said hydrocarbon with a halogen selected from the group consisting of chlorine, bromine and iodine, at a temperature of below 200° C. and in the presence of an aliphatic azo-compound which yields halogenation promoting free radicals under the operating conditions.

9. A process for the halogenation of saturated hydrocarbons which comprises reacting the hydrocarbon with a halogen selected from the group consisting of chlorine, bromine and iodine, in the absence of actinic radiation and in the presence of a halogenation promoting catalyst comprising an aliphatic azo-compound which yields free radicals under the operating conditions.

10. A process of halogenating, via substitution, a saturated organic compound which comprises reacting said compound with a halogen selected from the group consisting of chlorine, bromine and iodine, at a temperature of below 200° C. and in the presence of an aliphatic azo-compound which yields halogenation promoting free radicals under the operating conditions.

11. A process of halogenating, via substitution, a saturated organic compound which comprises reacting said compound with a halogen selected from the group consisting of chlorine, bromine and iodine, in the absence of actinic radiation and in the presence of an aliphatic azo-compound which yields halogenation promoting free radicals under the operating conditions.

12. A process of halogenating, via substitution, a saturated organic compound which comprises effecting a reaction between said compound and a halogen selected from the group consisting of chlorine, bromine and iodine, at a temperature below that at which non-catalytic halogenation normally occurs to any appreciable extent, and in the presence of a partially dissociated azo-compound.

13. A process for the halogenation, via substitution, of a saturated organic compound which comprises reacting said compound with a halogen selected from the group consisting of chlorine, bromine and iodine, in the presence of an azo-compound which yields free radicals under the operating conditions.

WILLIAM E. VAUGHAN.
FREDERICK F. RUST.